United States Patent
Sugimoto et al.

[11] Patent Number: 6,107,228
[45] Date of Patent: Aug. 22, 2000

[54] DIELECTRIC CERAMIC COMPOSITION AND CERAMIC ELECTRONIC ELEMENT USING THE SAME

[75] Inventors: Yasutaka Sugimoto, Kyoto; Hiroshi Takagi, Otsu, both of Japan

[73] Assignee: Murata Manufacturing Co., Ltd., Japan

[21] Appl. No.: 09/253,843

[22] Filed: Feb. 22, 1999

[30] Foreign Application Priority Data

Feb. 27, 1998 [JP] Japan .................................. 10-063978
Dec. 18, 1998 [JP] Japan .................................. 10-360397

[51] Int. Cl.⁷ .............................................. C04B 35/468
[52] U.S. Cl. ......................... 501/139; 501/32; 501/138; 361/321.4; 361/321.5
[58] Field of Search ................. 501/32, 138, 139; 361/321.4, 321.5

[56] References Cited

U.S. PATENT DOCUMENTS

| | | | |
|---|---|---|---|
| 5,264,403 | 11/1993 | Abe et al. | 501/139 |
| 5,292,694 | 3/1994 | Abe et al. | 501/139 |
| 5,304,521 | 4/1994 | Abe et al. | 501/139 |
| 5,350,721 | 9/1994 | Abe et al. | 501/139 |
| 5,479,140 | 12/1995 | Abe et al. | 501/139 |
| 5,485,132 | 1/1996 | Abe et al. | 501/139 |
| 5,488,019 | 1/1996 | Abe et al. | 501/139 |
| 5,493,262 | 2/1996 | Abe et al. | 501/139 |
| 5,635,435 | 6/1997 | Shibata et al. | 501/138 |

*Primary Examiner*—Karl Group
*Attorney, Agent, or Firm*—Ostrolen, Faber, Gerb & Soffen, LLP

[57] ABSTRACT

A dielectric ceramic composition which has a high dielectric constant and a high Q value, as well as excellent temperature stability, and which is sinterable at a relatively low temperature. The dielectric ceramic composition of the present invention is formed of a mixture of a $BaO—TiO_2—REO_{3/2}—BiO_3$ ceramic composition wherein RE represents a rare earth element, and a glass composition. The glass composition contains about 13–50 wt. % $SiO_2$, about 3–30 wt. % $B_2O_3$, about 40–80 wt. % alkaline earth metal oxide and about 0.1–10 wt. % $Li_2O$.

19 Claims, 3 Drawing Sheets

DIELECTRIC CERAMIC COMPOSITION AND CERAMIC ELECTRONIC ELEMENT USING THE SAME

BACKGROUND OF THE INVENTION

1. Field of the Invention

The present invention relates to a dielectric ceramic composition and to a ceramic electronic element using the same, particularly to a dielectric ceramic composition which is used as a material for a dielectric used in microwave resonators, filters, laminated capacitors, and other applications, or to a ceramic material for multilayer circuit boards and to a ceramic electronic element using the same.

2. Description of the Related Art

Conventionally, efforts have been made to replace cavity resonators with ceramic dielectrics having a high dielectric constant in order to miniaturize electronic apparatus such as microwave resonators and microwave filters. Briefly, the resonators and the filters are miniaturized by use of an effect that the wavelength of an electromagnetic wave in a dielectric is shortened to $1/\epsilon^{1/2}$ times that in free space, wherein $\epsilon$ represents the dielectric constant of the dielectric.

However, since the relative dielectric constant $\epsilon$ of a ceramic dielectric material having a temperature coefficient suitable for use as a dielectric resonator has so far been limited to 100 or less, the dielectric material has not met the recent demand for further miniaturization.

A method employing an LC resonator which has conventionally been known in connection with microwave circuits is effective for meeting the demand under restriction of relative dielectric constant $\epsilon$ of a ceramic dielectric material. Thus, a further miniaturized electronic apparatus having high reliability may be produced by application to fabrication of LC circuits of a lamination method which is adapted in practice for laminated capacitors and multilayer boards.

However, use of a lamination method to produce an LC resonator having a high Q value in a microwave region requires high electric conductivity of the internal electrode which is built into a laminated capacitor and a multilayer circuit board. Briefly, a metal material having high electric conductivity such as gold, silver or copper must be used for an internal electrode which is fired simultaneously with a dielectric or a multilayer circuit board. For this reason, the dielectric material must be a low-temperature-sinterable material which is able to be sintered simultaneously with internal electrodes formed of a metal material having a low melting point, and as well must have a high dielectric constant, a high Q value and a high degree of temperature stability. However, a dielectric material which meets all of these criteria has not yet been found.

SUMMARY OF THE INVENTION

In view of the foregoing, the present invention is directed to the provision of a dielectric ceramic composition which has a high relative dielectric constant, a high Q value and desirable temperature stability, and which is sinterable at relatively low temperature, as well as to the provision of a ceramic electronic element using the same.

In one aspect of the present invention, there is provided a dielectric ceramic composition comprising a mixture of a BaO—TiO$_2$—REO$_{3/2}$—Bi$_2$O$_3$-based ceramic composition (wherein RE represents a rare earth element) and a glass composition, the glass composition comprising about 13–50 wt. % SiO$_2$, about 3–30 wt. % B$_2$O$_3$, about 40–80 wt. % alkaline earth metal oxide and about 0.1–10 wt. % Li$_2$O.

Examples of rare earth elements RE include Sc, Y, La, Ce, Pr, Nd, Pm, Sm, Eu, Gd, Tb, Dy, Ho, Er, Tm, Yb, and Lu, and these elements may be used singly or in combination.

The dielectric ceramic composition may also contain CuO as an auxiliary component.

Preferably, the BaO—TiO$_2$—REO$_{3/2}$—Bi$_2$O$_3$-based ceramic composition in the dielectric ceramic composition according to the present invention comprises xBaO—yTiO$_2$—zREO$_{3/2}$ (wherein x, y, and z are based on mole % and satisfy the following expressions: $5 \leq x \leq 15$, $52.5 \leq y \leq 70$, $15 \leq z \leq 42.5$, and x+y+z=100) as a primary component, and Bi$_2$O$_3$ in an amount of about 3–30 wt. % with respect to 100 parts by weight of the primary component.

In the dielectric ceramic composition of the present invention, the alkaline earth metal oxide contained in the above-described glass composition may comprise BaO and at least one species selected from the group consisting of SrO, CaO and MgO, with the compositional proportions thereof preferably fall within the following ranges: about 35 wt. % or less SrO; about 35 wt. % or less CaO; about 20 wt. % or less MgO; and about 40–95 wt. % BaO.

Preferably, the BaO—TiO$_2$—REO$_{3/2}$—Bi$_2$O$_3$-based ceramic composition in the dielectric ceramic composition of the present invention accounts for about 75–95 wt. %, the glass composition accounts for about 2–20 wt. % and CuO accounts for about 5 wt. % or less.

In the dielectric ceramic composition of the present invention, the glass composition contains about 0.5–10 wt. % Li$_2$O and may further contain at least one additive selected from among TiO$_2$, CaTiO$_3$, SrTiO$_3$, and Nd$_2$Ti$_2$O$_7$. In this case, preferably, the BaO—TiO$_2$—REO$_{3/2}$—Bi$_2$O$_3$-based ceramic composition accounts for about 50–98 wt. %, the glass composition accounts for about 2–20 wt. %, the additive accounts for about 30 wt. % or less, and the CuO accounts for about 3 wt. % or less.

In another aspect of the present invention, there is provided a ceramic electronic element which employs the dielectric ceramic composition of the present invention.

In yet another aspect of the present invention, there is provided an LC composite element which employs the dielectric ceramic composition of the present invention.

DESCRIPTION OF PREFERRED EMBODIMENTS

When a dielectric ceramic composition is formed of a mixture of a BaO—TiO$_2$—REO$_{3/2}$-based ceramic composition (wherein RE represents a rare earth element) and an SiO$_2$—B$_2$O$_3$-alkaline earth metal oxide-Li$_2$O glass composition, the dielectric ceramic composition can be sintered at a temperature lower than the melting point of an electric conductor containing, as a primary component, a low-specific-resistance metal selected from silver, gold and copper. Moreover, there can be obtained a dielectric ceramic composition having a high relative dielectric constant within the high-frequency region, particularly within the microwave region and the millimeter wave region, and excellent temperature stability.

Addition of CuO, as an auxiliary component, to the mixture comprising the ceramic composition and glass composition further lowers sintering temperature of the resultant mixture and increases the Q value and the relative dielectric constant thereof.

Moreover, $TiO_2$, $CaTiO_3$ and $SrTiO_3$ have a negative temperature-dependent characteristic of dielectric constant and $Nd_2Ti_2O_7$ has a positive temperature-dependent characteristic of dielectric constant. Therefore, addition thereof in an appropriate amount enables control of the temperature coefficient of dielectric constant of the produced dielectric ceramic composition and ceramic electronic element.

Therefore, such a dielectric ceramic composition can be fired simultaneously with a low-specific-resistance internal electrode made of gold, silver, copper, etc., to thereby yield dielectrics or multilayer circuit boards containing such an internal electrode and having excellent high-frequency characteristics and a desirable temperature coefficient of dielectric constant. An electronic apparatus such as an LC resonator, an LC filter or a laminated capacitors having a high Q value can be further miniaturized by use of the lamination method and the dielectric ceramic composition.

Reasons why the above compositional proportions are preferred will next be described.

The glass composition comprises about 13–50 wt. % $SiO_2$, about 3–30 wt. % $B_2O_3$, about 40–80 wt. % alkaline earth metal oxide (BaO, SrO, CaO, MgO) and about 0.1–10 wt. % $Li_2O$.

When the $SiO_2$ content is in excess of about 50 wt. %, the glass softening temperature increases drastically and ceramic compositions containing $SiO_2$ in such a large amount cannot be sintered, whereas when the $SiO_2$ content is less than about 13 wt. %, moisture resistance is adversely affected.

In addition, $B_2O_3$ contained in the glass composition lowers the glass viscosity and accelerates sintering of a dielectric ceramic composition. However, when the $B_2O_3$ content is in excess of about 30 wt. %, moisture resistance is adversely affected, whereas when it is less than about 3 wt. %, the composition is not sintered at 1000° C. or less.

Furthermore, the alkaline earth metal oxide promotes reaction between the ceramic composition and the glass composition and lowers the softening point of the glass composition. However, when the alkaline earth metal oxide content is less than about 40 wt. %, the sinterability decreases to induce difficulty in sintering at 1000° C. or less, whereas when it is in excess of about 80 wt. %, moisture resistance is adversely affected.

When the BaO content of the alkaline earth metal oxide is in excess of about 95 wt. %, moisture resistance is adversely affected, whereas when it is less than about 40 wt. %, the sinterability decreases. Moisture resistance is unsatisfactory when the composition fails to contain at least one species selected from among SrO, CaO and MgO in an amount of at least about 5 wt. %. $Li_2O$ lowers the glass softening point. However, when the $Li_2O$ content is less than about 0.1 wt. %, the softening point increases drastically to prevent sintering, whereas when it is in excess of about 10 wt. %, moisture resistance is unsatisfactory.

Furthermore, $TiO_2$, $CaTiO_3$, $SrTiO_3$ and $Nd_2Ti_2O_7$ are added in an amount of about 30 wt. % or less, since addition thereof in excess of about 30 wt. % deteriorates sinterability.

The compositional proportions of the primary component of the ceramic composition will next be described.

Figure 1:
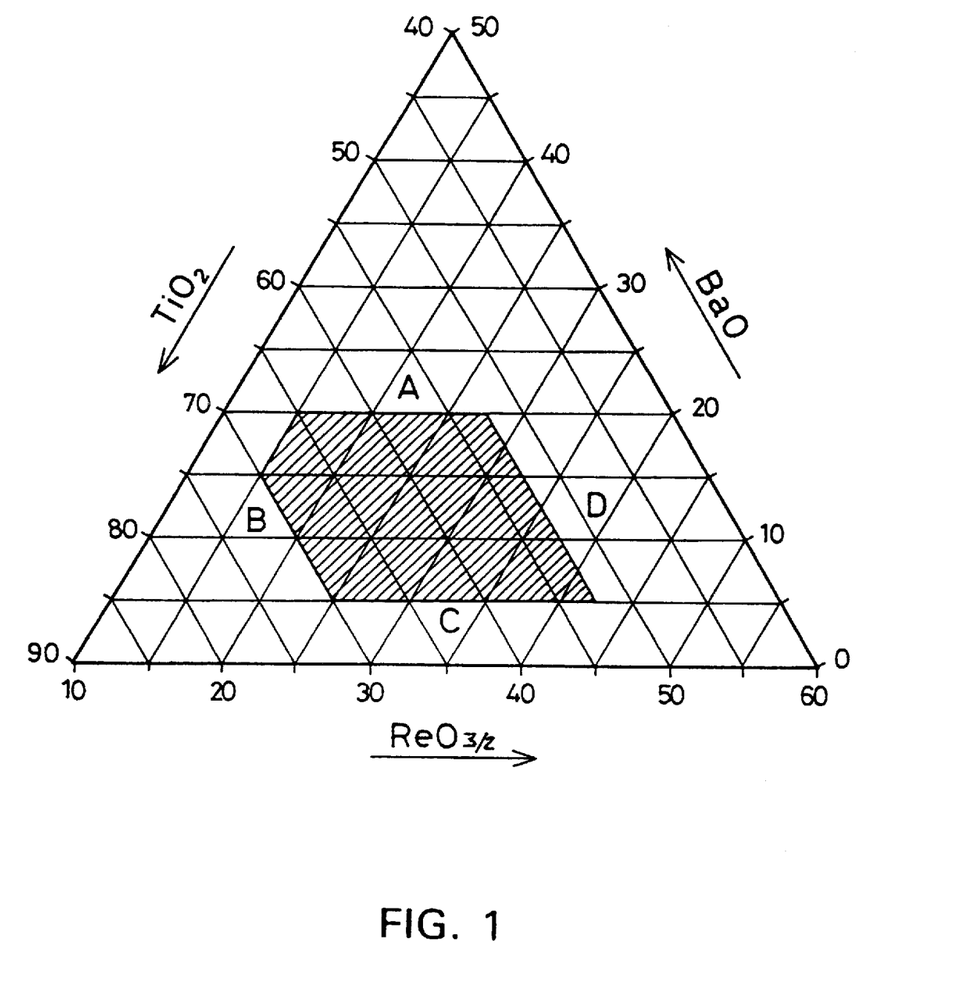
FIG. 1 is a ternary diagram of a BaO—TiO$_2$—REO$_{3/2}$ ceramic composition.

FIG. 1 shows a ternary diagram referring to the compositional ranges of a $BaO$—$TiO_2$—$REO_{3/2}$-based ceramic composition that is the primary component of the dielectric ceramic composition of the present invention ($Bi_2O_3$ at 10 wt. %). The compositional proportions of the $BaO$—$TiO_2$—$REO_{3/2}$-based ceramic composition, when represented by $xBaO$—$yTiO_2$—$zREO_{3/2}$, fall within the ranges satisfying $5 \leq x \leq 15$, $52.5 \leq y \leq 70$, $15 \leq z \leq 42.5$, and $x+y+z=100$, wherein each of x, y, and z is based on mole %, and the composition preferably falls within the domain indicated by the hatching in FIG. 1. A composition falling within the domain A indicated in FIG. 1 is difficult to sinter and merely provides a porous ceramic at 1400° C., which is normally the temperature required for sintering. When a composition falls within the domain B, temperature-dependent characteristics, i.e., the temperature coefficient of change in capacitance of a capacitor formed inside a multilayer circuit board, decreases drastically to a negative value. When a composition falls within the domain C, the relative dielectric constant is extremely small and sinterability is variable. Furthermore, when a composition falls within the domain D, the temperature coefficient of change in capacitance increases drastically to a positive value and the relative dielectric constant decreases.

The dielectric ceramic composition according to the present invention contains $Bi_2O_3$. Incorporation of $Bi_2O_3$ produces a high-frequency dielectric ceramic composition having more stable characteristics and makes the sintering temperature lower. However, when $Bi_2O_3$ is incorporated in an amount in excess of about 30 wt. %, the Q value decreases. Thus, $Bi_2O_3$ is preferably incorporated in an amount of about 3–30 wt. % to a $BaO$—$TiO_2$—$NdO_{3/2}$ ceramic composition which falls within the compositional domain indicated by the hatching in FIG. 1.

When the amount of the glass composition contained in the dielectric ceramic composition is less than about 2 wt. %, sintering is difficult, whereas when it is in excess of about 20 wt. %, moisture resistance decreases to lower the relative dielectric constant.

CuO also works as a sintering aid. When the CuO content is in excess of about 5 wt. %, the Q value decreases to shift the temperature coefficient of capacitance to a high positive value.

The above-described objects of the present invention, as well as other objects, features, and advantages thereof, will become more clear from the below-described detailed description of the modes for carrying out the invention with reference to the accompanying drawings.

EXAMPLES

Example 1

First, ceramic compositions were produced.

$BaCO_3$, $TiO_2$ and $REO_{3/2}$ (RE represents a rare earth element) were weighed and mixed together to obtain mixtures having compositional ratios with regard to BaO, $TiO_2$ and $REO_{3/2}$ indicated in the columns showing the primary component in Table 1. Then, $Bi_2O_3$ powder was added to each of the above mixtures so as to realize a compositional ratio (weight ratio to 100 parts of the primary component) indicated in the column showing the secondary component in Table 1, and the resultant mixture was mixed thoroughly.

The mixture was calcined at 1150° C. for one hour to form a calcined compact, which was then crushed and mixed. The mixture was then fired at 1300° C., to thereby obtain a ceramic. High-frequency ceramic compositions S1 through S25 and S42 serving as $BaO-TiO_2-REO_{3/2}-Bi_2O_3$-based ceramic compositions and shown in Table 1 were produced by crushing the corresponding ceramics again.

The obtained ceramics were subjected to measurement of relative dielectric constant, Q value and temperature coefficient of change in dielectric constant (ppm/° C.). Results of the measurements are shown in Table 1.

These ceramic compositions were used to prepare dielectric ceramic compositions shown below. In Table 1, element symbols in the column labeled $REO_{3/2}$ represent the corresponding rare earth elements and the amount of $Bi_2O_3$ is represented by wt. % based on 100 parts by weight of the primary component.

TABLE 1

| Ceramic Composition No. | Primary component (mole ratio) | | | Secondary component (weight ratio) $Bi_2O_3$ | Relative dielectric constant ($\epsilon$) | Q at 1 GHz | Temperature coefficient of dielectric constant (ppm/° C.) |
| --- | --- | --- | --- | --- | --- | --- | --- |
| | BaO | $TiO_2$ | $ReO_{3/2}$ | | | | |
| S1 | 13 | 61 | Nd:26 | 15 | 105 | 4000 | +35 |
| S2 | 15 | 70 | Nd:15 | 15 | 95 | 2000 | −60 |
| S3 | 20 | 55 | Nd:25 | 15 | 90 | 2500 | −80 |
| S4 | 5 | 70 | Nd:25 | 15 | 75 | 3000 | −50 |
| S5 | 5 | 55 | Nd:40 | 15 | 64 | 2000 | +40 |
| S6 | 20 | 60 | Nd:20 | 15 | 110 | 3000 | −90 |
| S7 | 10 | 75 | Nd:15 | 15 | 82 | 2500 | −100 |
| S8 | 2 | 65 | Nd:33 | 15 | 60 | 2000 | +30 |
| S9 | 10 | 50 | Nd:40 | 10 | 57 | 2000 | +60 |
| S10 | 13 | 61 | Nd:26 | 0 | 65 | 3500 | −10 |
| S11 | 13 | 61 | Nd:26 | 3 | 82 | 3800 | −10 |
| S12 | 13 | 61 | Nd:26 | 30 | 101 | 3000 | +60 |
| S13 | 13 | 61 | Nd:26 | 35 | 95 | 500 | +80 |
| S14 | 13 | 65 | Nd:22 | 3 | 79 | 3000 | −5 |
| S15 | 13 | 60 | Nd:27 | 3 | 65 | 3200 | +30 |
| S16 | 25 | 60 | Nd:20 | 3 | 79 | 1800 | −90 |
| S17 | 2 | 5 | Nd:93 | 3 | 39 | 2000 | +50 |
| S18 | 13 | 61 | La:26 | 15 | 105 | 3000 | 0 |
| S19 | 13 | 61 | Pr:26 | 15 | 99 | 4000 | −5 |
| S20 | 13 | 61 | Sm:26 | 15 | 97 | 4500 | +5 |
| S21 | 13 | 61 | 26 (La/Nd = 0.5/0.5) | 15 | 99 | 4000 | 0 |
| S22 | 13 | 61 | 26 (Pr/Nd = 0.25/0.75) | 15 | 99 | 4000 | 0 |
| S23 | 13 | 65 | 22 (Pr/Nd = 0.5/0.75) | 15 | 105 | 3000 | −5 |
| S24 | 13 | 65 | 22 (Pr/Nd = 0.25/0.5) | 15 | 103 | 4000 | +5 |
| S25 | 13 | 61 | 26 (Sm/Nd = 0.5/0.5) | 15 | 96 | 4500 | +10 |
| S42 | 15 | 75 | Nd:10 | 15 | 85 | 2000 | −120 |

With regard to glass compositions, $B_2O_3$, SrO, CaO, MgO, $Bi_2O_3$, $SiO_2$ and $Li_2O$ were weighed and sufficiently mixed together to obtain mixtures having compositional ratios (weight ratios) indicated in Table 2. Each of the mixtures was melted at 1100–1400° C. and quenched by pouring into water, then wet-milled to thereby obtain glass compositions G1 through G30. In Table 2, R represents the alkaline earth metal. The total amount of RO and amounts of $B_2O_3$, $SiO_2$ and $Li_2O$ are based on wt. % of the corresponding glass compositions.

TABLE 2

| Glass composition No. | Total amount of RO | Alkaline earth metal oxide RO | | | | $B_2O_3$ | $SiO_2$ | $Li_2O$ |
| --- | --- | --- | --- | --- | --- | --- | --- | --- |
| | | % by weight of respective components in RO | | | | | | |
| | | BaO | SrO | CaO | MgO | | | |
| G1 | 61 | 82 | 11 | 5 | 2 | 14 | 23 | 2 |
| G2 | 30 | 82 | 11 | 5 | 2 | 29 | 39 | 2 |
| G3 | 40 | 82 | 11 | 5 | 2 | 25 | 33 | 2 |
| G4 | 80 | 82 | 11 | 5 | 2 | 5 | 13 | 2 |
| G5 | 90 | 82 | 11 | 5 | 2 | 3 | 5 | 2 |
| G6 | 67 | 82 | 11 | 5 | 2 | 1 | 30 | 2 |
| G7 | 66 | 82 | 11 | 5 | 2 | 3 | 29 | 2 |
| G8 | 50 | 82 | 11 | 5 | 2 | 30 | 18 | 2 |
| G9 | 44 | 82 | 11 | 5 | 2 | 40 | 14 | 2 |
| G10 | 70 | 82 | 11 | 5 | 2 | 20 | 8 | 2 |
| G11 | 68 | 82 | 11 | 5 | 2 | 17 | 13 | 2 |

TABLE 2-continued

| Glass composition No. | Total amount of RO | Alkaline earth metal oxide RO | | | | $B_2O_3$ | $SiO_2$ | $Li_2O$ |
| --- | --- | --- | --- | --- | --- | --- | --- | --- |
| | | % by weight of respective components in RO | | | | | | |
| | | BaO | SrO | CaO | MgO | | | |
| G12 | 40 | 82 | 11 | 5 | 2 | 8 | 50 | 2 |
| G13 | 30 | 82 | 11 | 5 | 2 | 8 | 60 | 2 |

TABLE 2-continued

| Glass composition No. | Total amount of RO | % by weight of respective components in RO |  |  |  | $B_2O_3$ | $SiO_2$ | $Li_2O$ |
|---|---|---|---|---|---|---|---|---|
| | | BaO | SrO | CaO | MgO | | | |
| G14 | 63 | 82 | 11 | 5 | 2 | 14 | 23 | 0 |
| G15 | 62.9 | 82 | 11 | 5 | 2 | 14 | 21 | 0.1 |
| G16 | 57 | 82 | 11 | 5 | 2 | 12 | 21 | 10 |
| G17 | 55 | 82 | 11 | 5 | 2 | 11 | 19 | 15 |
| G18 | 61 | 30 | 35 | 25 | 10 | 14 | 23 | 2 |
| G19 | 61 | 40 | 33 | 24 | 3 | 14 | 23 | 2 |
| G20 | 61 | 95 | 2 | 2 | 1 | 14 | 23 | 2 |
| G21 | 61 | 100 | 0 | 0 | 0 | 14 | 23 | 2 |
| G22 | 61 | 85 | 0 | 13 | 2 | 14 | 23 | 2 |
| G23 | 61 | 45 | 35 | 18 | 2 | 14 | 23 | 2 |
| G24 | 61 | 40 | 45 | 13 | 2 | 14 | 23 | 2 |
| G25 | 61 | 85 | 13 | 0 | 2 | 14 | 23 | 2 |
| G26 | 61 | 50 | 12 | 35 | 2 | 14 | 23 | 2 |
| G27 | 61 | 40 | 13 | 45 | 2 | 14 | 23 | 2 |
| G28 | 61 | 83 | 12 | 5 | 0 | 14 | 23 | 2 |
| G29 | 61 | 60 | 15 | 5 | 20 | 14 | 23 | 2 |
| G30 | 61 | 55 | 15 | 5 | 25 | 14 | 23 | 2 |

Then, to each of the thus-obtained ceramic compositions S1 through S25, a glass composition selected from G1 through G30 and CuO powder were added so as to produce mixtures having compositional ratios indicated in Tables 3 and 4, which were then mixed thoroughly to provide raw mixtures. To the raw mixtures, appropriate amounts of a binder, plasticizer and solvent were added, and the mixtures were kneaded to provide slurries.

Each of the thus-obtained slurries was molded, through a doctor blade coating method, into a sheet having a thickness of 50 μm, and the produced ceramic green sheet was cut into pieces having a size of 30 mm×10 mm. The pieces were laminated and pressed to form a sheet having a thickness of 0.5 mm. Plate-like dielectric ceramics of sample Nos. 1 to 67 were obtained by firing the corresponding pressed sheets in air at 900° C. for one hour.

The dielectric ceramics obtained as above were subjected to measurement of relative dielectric constant, Q value and temperature coefficient of change in dielectric constant (ppm/° C.). The results of measurement are shown in Tables 3 and 4. The amounts of components in Tables 3 and 4 are based on wt. % in the corresponding dielectric ceramic compositions. The relative dielectric constant was measured at a frequency of 1 MHz.

TABLE 3

| Sample No. | Ceramic composition No. | Ceramic composition Amount | Glass composition No. | Glass composition Amount | CuO content | Firing temperature (° C.) | Relative dielectric constant (ε) | Q | Temperature coefficient of change in capacitance (ppm/° C.) | Remarks |
|---|---|---|---|---|---|---|---|---|---|---|
| 1 | S1 | 88.5 | G1 | 10 | 1.5 | 900 | 78 | 3700 | −5 | |
| 2 | S2 | 88.5 | G1 | 10 | 1.5 | 900 | 67 | 1900 | −40 | |
| 3 | S3 | 88.5 | G1 | 10 | 1.5 | 900 | 62 | 2000 | −55 | |
| 4 | S4 | 88.5 | G1 | 10 | 1.5 | 900 | 58 | 2500 | −54 | |
| 5 | S5 | 88.5 | G1 | 10 | 1.5 | 900 | 52 | 1800 | +10 | |
| 6 | S6 | 88.5 | G1 | 10 | 1.5 | 900 | 82 | 2500 | −110 | |
| 7 | S7 | 88.5 | G1 | 10 | 1.5 | 900 | 58 | 1700 | −130 | |
| 8 | S8 | 88.5 | G1 | 10 | 1.5 | 900 | 40 | 1300 | 0 | |
| 9 | S9 | 88.5 | G1 | 10 | 1.5 | 900 | 35 | 1000 | +25 | |
| 10* | S10 | 88.5 | G1 | 10 | 1.5 | 900 | — | — | — | Not sintered |
| 11 | S11 | 88.5 | G1 | 10 | 1.5 | 900 | 67 | 3000 | −20 | |
| 12 | S12 | 88.5 | G1 | 10 | 1.5 | 900 | 82 | 1500 | +25 | |
| 13 | S13 | 88.5 | G1 | 10 | 1.5 | 900 | 73 | 800 | +40 | |
| 14* | S1 | 88.5 | G2 | 10 | 1.5 | 900 | — | — | — | Not sintered |
| 15 | S1 | 88.5 | G3 | 10 | 1.5 | 900 | 69 | 3500 | −15 | |
| 16 | S1 | 88.5 | G4 | 10 | 1.5 | 900 | 78 | 3000 | −20 | |
| 17* | S1 | 88.5 | G5 | 10 | 1.5 | 900 | 80 | 2500 | −30 | Poor moisture resistant |
| 18* | S1 | 88.5 | G6 | 10 | 1.5 | 900 | — | — | — | Not sintered |
| 19 | S1 | 88.5 | G7 | 10 | 1.5 | 900 | 72 | 4000 | −5 | |
| 20 | S1 | 88.5 | G8 | 10 | 1.5 | 900 | 76 | 2500 | −10 | |
| 21* | S1 | 88.5 | G9 | 10 | 1.5 | 900 | 77 | 2400 | −20 | Poor moisture resistance |
| 22* | S1 | 88.5 | G10 | 10 | 1.5 | 900 | 81 | 2100 | −20 | Poor moisture resistance |
| 23 | S1 | 88.5 | G11 | 10 | 1.5 | 900 | 79 | 2700 | −10 | |
| 24 | S1 | 88.5 | G12 | 10 | 1.5 | 900 | 75 | 3000 | +5 | |
| 25* | S1 | 88.5 | G13 | 10 | 1.5 | 900 | — | — | — | Not sintered |
| 26* | S1 | 88.5 | G14 | 10 | 1,5 | 900 | — | — | — | Not sintered |
| 27 | S1 | 88.5 | G15 | 10 | 1.5 | 900 | 73 | 3800 | +10 | |
| 28 | S1 | 88.5 | G16 | 10 | 1.5 | 900 | 79 | 2800 | −20 | |
| 29* | S1 | 88.5 | G17 | 10 | 1.5 | 900 | 80 | 2000 | −20 | Poor moisture resistance |
| 30 | S1 | 88.5 | G18 | 10 | 1.5 | 900 | — | — | — | Insufficiently sintered |
| 31 | S1 | 88.5 | G19 | 10 | 1.5 | 900 | 69 | 3000 | +15 | |
| 32 | S1 | 88.5 | G20 | 10 | 1.5 | 900 | 80 | 3200 | −10 | |
| 33 | S1 | 88.5 | G21 | 10 | 1.5 | 900 | 81 | 3100 | −5 | Insufficient moisture resistance |
| 34 | S1 | 88.5 | G22 | 10 | 1.5 | 900 | 79 | 320 | −5 | |
| 35 | S1 | 88.5 | G23 | 10 | 1.5 | 900 | 70 | 3000 | +15 | |

*Outside the scope of the invention

TABLE 4

| Sample No. | Ceramic composition No. | Ceramic composition Amount | Glass composition No. | Glass composition Amount | CuO content | Firing temperature (° C.) | Relative dielectric constant (ε) | Q | Temperature coefficient of change in capacitance (ppm/° C.) | Remarks |
|---|---|---|---|---|---|---|---|---|---|---|
| 36 | S1 | 88.5 | G24 | 10 | 1.5 | 900 | — | — | — | Insufficiently sintered |
| 37 | S1 | 88.5 | G25 | 10 | 1.5 | 900 | 77 | 3200 | 0 | |
| 38 | S1 | 88.5 | G26 | 10 | 1.5 | 900 | 68 | 2800 | +20 | |
| 39 | S1 | 88.5 | G27 | 10 | 1.5 | 900 | — | — | — | Insufficiently sintered |
| 40 | S1 | 88.5 | G28 | 10 | 1.5 | 900 | 79 | 3000 | +5 | |
| 41 | S1 | 88.5 | G29 | 10 | 1.5 | 900 | 63 | 3300 | 0 | |
| 42 | S1 | 88.5 | G30 | 10 | 1.5 | 900 | — | — | — | Insufficiently sintered |
| 43 | S1 | 90.0 | G1 | 10 | 0 | 900 | 63 | 2000 | +15 | |
| 44 | S1 | 89.8 | G1 | 10 | 0.2 | 900 | 72 | 3000 | +5 | |
| 45 | S1 | 87.0 | G1 | 10 | 3.0 | 900 | 79 | 2400 | −10 | |
| 46 | S1 | 87.0 | G1 | 10 | 5.0 | 900 | 85 | 100 | +210 | |
| 47 | S1 | 97.0 | G1 | 1.5 | 2.5 | 900 | — | — | — | Insufficiently sintered |
| 48 | S1 | 95.5 | G1 | 2 | 2.5 | 900 | 82 | 3000 | −50 | |
| 49 | S1 | 78.5 | G1 | 20 | 1.5 | 900 | 55 | 1200 | +30 | |
| 50 | S1 | 68.5 | G1 | 30 | 1.5 | 900 | 43 | 500 | +60 | Insufficient moisture resistance |
| 51 | S14 | 88.5 | G1 | 10 | 1.5 | 900 | 52 | 2000 | −5 | |
| 52 | S15 | 88.5 | G1 | 10 | 1.5 | 900 | 46 | 2700 | +35 | |
| 53 | S16 | 88.5 | G1 | 10 | 1.5 | 900 | 58 | 1500 | −110 | |
| 54 | S17 | 88.5 | G1 | 10 | 1.5 | 900 | 25 | 1200 | +45 | |
| 55 | S18 | 88.5 | G1 | 10 | 1.5 | 900 | 80 | 3000 | −20 | |
| 56 | S19 | 88.5 | G1 | 10 | 1.5 | 900 | 77 | 3300 | −15 | |
| 57 | S20 | 88.5 | G1 | 10 | 1.5 | 900 | 75 | 3500 | +15 | |
| 58 | S21 | 88.5 | G1 | 10 | 1.5 | 900 | 78 | 3600 | −10 | |
| 59 | S22 | 88.5 | G1 | 10 | 1.5 | 900 | 77 | 3400 | −15 | |
| 60 | S23 | 88.5 | G1 | 10 | 1.5 | 900 | 82 | 3000 | −10 | |
| 61 | S24 | 88.5 | G1 | 10 | 1.5 | 900 | 81 | 3000 | −5 | |
| 62 | S25 | 88.5 | G1 | 10 | 1.5 | 900 | 76 | 3000 | +5 | |
| 63 | S1 | 90.0 | G4 | 10 | 0 | 900 | 64 | 1300 | −15 | |
| 64 | S1 | 96.0 | G7 | 4 | 0 | 900 | — | — | — | Insufficiently sintered |
| 65 | S1 | 87.5 | G12 | 12 | 0.5 | 900 | 66 | 3000 | −10 | |
| 66 | S1 | 87.0 | G16 | 12 | 1.0 | 900 | 73 | 2000 | −10 | |
| 67 | S1 | 88.0 | G4 | 12 | 0 | 900 | 65 | 1300 | −20 | |
| 119 | S42 | 88.5 | G1 | 10 | 1.5 | 900 | 63 | 1000 | −150 | |

*: Outside the scope of the invention

As shown in the sample Nos. 1 through 5, 11, 12, 15, 16, 19, 20, 23, 24, 27, 28, 31, 32, 34, 35, 37, 38, 40, 41, 43 through 45, 48, 49, 51, 52, 55 through 63, and 65 through 67, the dielectric ceramic compositions of the present invention having a composition falling within the preferable compositional ranges have excellent characteristics, i.e., a firing temperature as low as 900° C. or less, a high relative dielectric constant, a small absolute value of temperature coefficient of change in capacitance (ppm/° C.) and a high Q value.

The comparison of the sample Nos. 43, 63, and 67 with the other samples reveals that addition of CuO increases Q value and dielectric constant.

In the Tables, the term "not sintered" denotes that sintering is impossible, and the term "insufficiently sintered" denotes that sintering may be possible under appropriate conditions, although the sinterability is low under the conditions of the present invention. The term "poor moisture resistance" refers to moisture resistance which is so poor as to prevent practical use, and the term "insufficient moisture resistance" refers to moisture resistance which is sufficiently applicable in practice under specific conditions, although it is slightly low.

In contrast, as shown in sample Nos. 10, 14, 17, 18, 21, 22, 25, 26, and 29, the dielectric ceramic compositions having a composition falling outside the compositional range of the present invention could not be sintered or were sintered insufficiently to yield poor moisture resistance.

CuO incorporated as an auxiliary component may be added by preparing glass compositions containing CuO so as to have compositional proportions shown in Tables 3 and 4 and adding the thus-prepared compositions to high-frequency ceramic compositions as well as adding CuO, as described in the example, to mixtures of the ceramic compositions and the glass compositions, to exhibit equivalent effects.

Example 2

Figure 2:
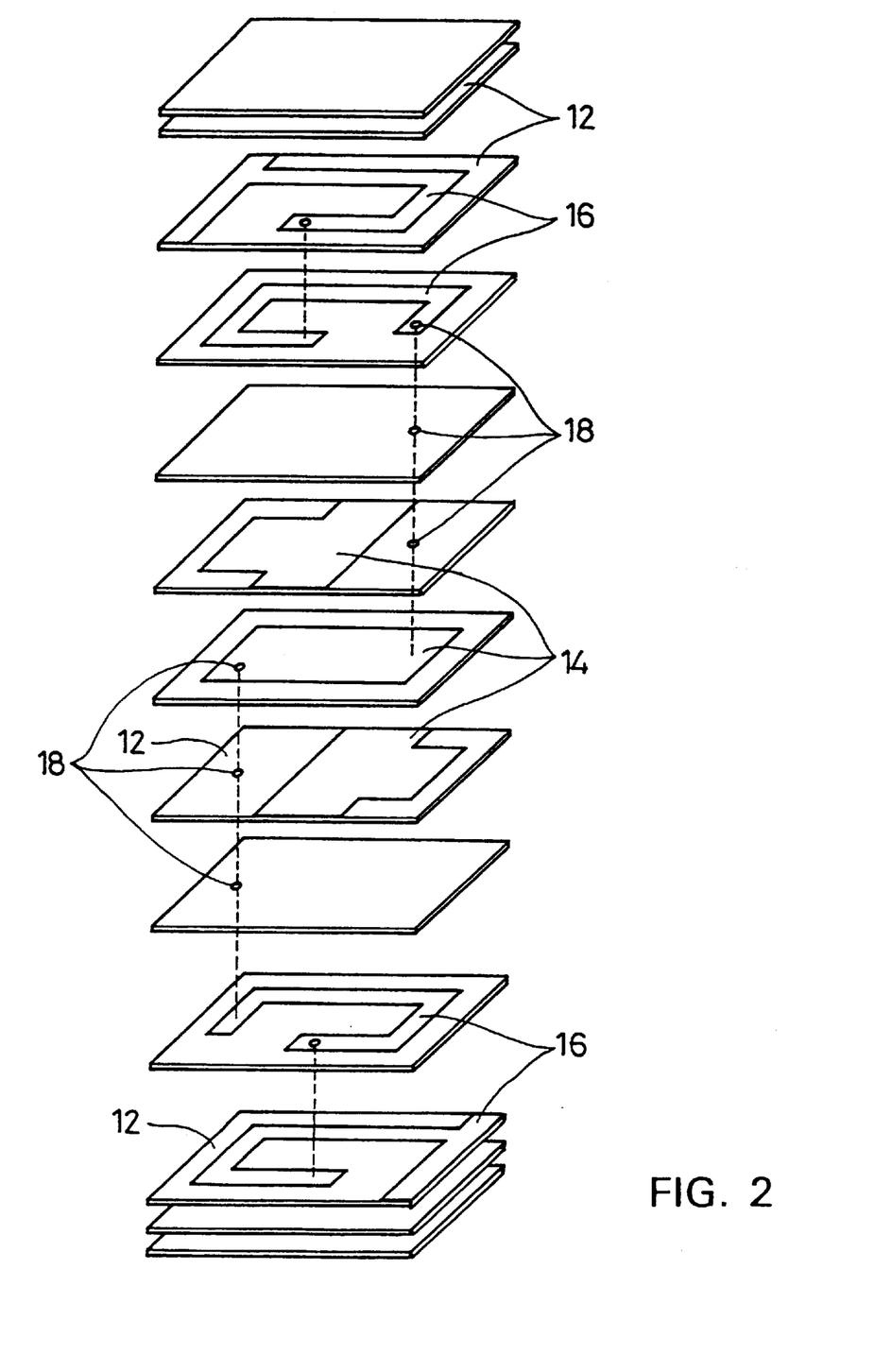
FIG. 2 is an exploded perspective view of an LC filter serving as an example of the ceramic electronic element according to the present invention.
Figure 3:
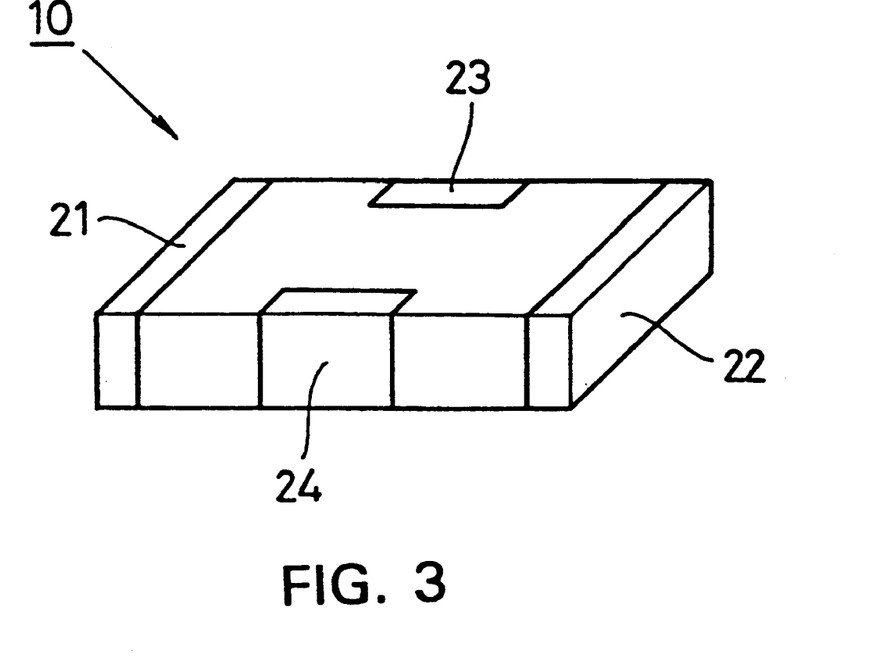
FIG. 3 is a perspective view of the LC filter illustrated in FIG. 2.
Figure 4:
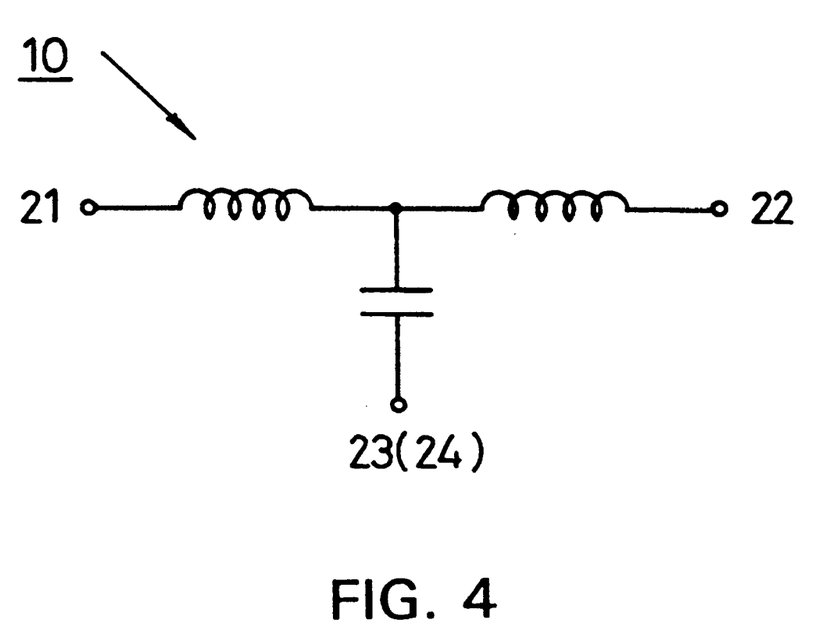
FIG. 4 is an equivalent circuit diagram of the LC filter illustrated in FIG. 3.

The ceramic electronic element according to the present invention will next be described by way of example with reference to FIGS. 2 through 4. In this Example, an LC filter 10 was produced as an electronic element. First, a slurry was prepared from the ceramic composition of sample No. 1 in Example 1 shown in Table 3 and cast into a ceramic green sheet having a thickness of 40 μm by use of a doctor blade. The green sheet was dried and punched to thereby provide green sheets 12 having a predetermined size. Onto the green sheets, there were provided capacitor patterns 14, coil patterns 16, etc. shown in FIG. 2 by use of an Ag paste and through screen printing. Holes 18 to make via-holes were opened by use of a puncher and filled with an Ag paste.

Then, the green sheets were laminated and pressed to thereby provide a laminate, which was fired at 900° C. External electrodes 21, 22, 23, and 24 were formed on the fired laminate to provide an LC filter, of which a perspective view is shown in FIG. 3 and an equivalent circuit diagram is shown in FIG. 4.

Similarly, an LC filter was produced from the ceramic composition of sample No. 43 in Example 1 in Table 4.

Thus, in all cases, LC composite elements having a high dielectric constant and Q value were obtained through a lamination method.

Similarly, other LC composite elements and ceramic electronic elements may be obtained by use of the dielectric ceramic composition of the present invention.

Example 3

Another example of the dielectric ceramic composition according to the present invention will next be described. $BaCO_3$, $TiO_2$ and $RE_2O_3$ (RE represents a rare earth element) were weighed and mixed together, to obtain mixtures having compositional ratios with regard to BaO, $TiO_2$ and $REO_{3/2}$ indicated in the columns showing the primary component in Table 5. Then, $Bi_2O_3$ powder was added to each of the above mixtures so as to realize a compositional ratio (weight ratio to 100 parts of the primary component) indicated in the column showing the secondary component in Table 5, and the resultant mixture was mixed thoroughly. The mixture was calcined at 1150° C. for one hour to form a calcined compact, which was then crushed and mixed. The mixture was then fired at 1300–1400° C., to thereby obtain a ceramic. High-frequency ceramic compositions S26 through S41 serving as $BaO$—$TiO_2$—$REO_{3/2}$—$Bi_2O_3$-based ceramic compositions and shown in Table 1 were produced by crushing the corresponding ceramics again.

The obtained ceramics were subjected to measurement of relative dielectric constant, Q value and temperature coefficient of change in capacitance (ppm/° C.). Results of the measurement are shown in Table 1. These ceramic compositions were used to prepare dielectric ceramic compositions shown below. In Table 5, element symbols in the column labeled $REO_{3/2}$ represent the corresponding rare earth elements and the amount of $Bi_2O_3$ is represented by wt. % with respect to 100 parts by weight of the primary component.

With regard to glass compositions, $B_2O_3$, SrO, CaO, MgO, $Bi_2O_3$, $SiO_2$ and $Li_2O$ were weighed and sufficiently mixed together to obtain mixtures having compositional ratios (weight ratios) indicated in Table 6. Each of the mixtures was melted at 1100–1400° C. and quenched by pouring into water, then wet-milled to thereby obtain glass compositions G31 through G44. In Table 6, R represents the alkaline earth metal. The total amount of RO and amounts of $B_2O_3$, $SiO_2$ and $Li_2O$ are based on wt. % of the corresponding glass compositions.

TABLE 6

| Glass composition No. | Alkaline earth metal oxide RO | | | | | $B_2O_3$ | $SiO_2$ | $Li_2O$ |
|---|---|---|---|---|---|---|---|---|
| | Total Amount of RO | Proportions of respective components in RO | | | | | | |
| | | BaO | SrO | CaO | MgO | | | |
| G31 | 61 | 82 | 11 | 5 | 2 | 14 | 23 | 2 |
| G32 | 30 | 82 | 11 | 5 | 2 | 29 | 39 | 2 |
| G33 | 40 | 82 | 11 | 5 | 2 | 25 | 33 | 2 |
| G34 | 80 | 82 | 11 | 5 | 2 | 5 | 13 | 2 |
| G35 | 90 | 82 | 11 | 5 | 2 | 3 | 5 | 2 |
| G36 | 67 | 82 | 11 | 5 | 2 | 1 | 30 | 2 |
| G37 | 50 | 82 | 11 | 5 | 2 | 30 | 18 | 2 |
| G38 | 44 | 82 | 11 | 5 | 2 | 40 | 14 | 2 |
| G39 | 40 | 82 | 11 | 5 | 2 | 8 | 50 | 2 |
| G40 | 30 | 82 | 11 | 5 | 2 | 8 | 60 | 2 |
| G41 | 63 | 82 | 11 | 5 | 2 | 14 | 23 | 0 |
| G42 | 62.5 | 82 | 11 | 5 | 2 | 14 | 23 | 0.5 |
| G43 | 57 | 82 | 11 | 5 | 2 | 12 | 21 | 10 |
| G44 | 55 | 82 | 11 | 5 | 2 | 11 | 19 | 15 |

Then, to each of the thus-obtained ceramic compositions S26 through S41, a glass composition selected from G31 through G44 and CuO powder were added so as to produce mixtures having compositional ratios indicated in Tables 7 and 8, which were then mixed thoroughly to provide raw mixtures. To the raw mixtures, $TiO_2$, $CaTiO_3$, $SrTiO_3$ and $Nd_2Ti_2O_7$ were added so as to produce mixtures having the weight ratios indicated in Tables 7 and 8 and then an appropriate amount of a binder, a plasticizer and a solvent were added, and the mixtures were kneaded to provide slurries.

TABLE 5

| First ceramic composition No. | Primary component (mole ratio) | | | Secondary component (weight ratio) | Relative Dielectric constant | Q at | Temperature coefficient of dielectric constant |
|---|---|---|---|---|---|---|---|
| | BaO | $TiO_2$ | $ReO_{8/2}$ | $Bi_2O_3$ | ($\epsilon$) | 1 GHz | (ppm/° C.) |
| S26 | 13 | 61 | Nd:26 | 10 | 105 | 4000 | +35 |
| S27 | 15 | 70 | Nd:15 | 10 | 95 | 2000 | −60 |
| S28 | 15 | 55 | Nd:30 | 10 | 90 | 2500 | −80 |
| S29 | 5 | 70 | Nd:25 | 15 | 75 | 3000 | −50 |
| S30 | 5 | 55 | Nd:40 | 10 | 64 | 2000 | +40 |
| S31 | 20 | 60 | Nd:20 | 10 | 110 | 3000 | −90 |
| S32 | 10 | 75 | Nd:15 | 10 | 82 | 2500 | −100 |
| S33 | 2 | 65 | Nd:33 | 10 | 60 | 2000 | +30 |
| S34 | 10 | 50 | Nd:40 | 10 | 57 | 2000 | +60 |
| S35 | 13 | 61 | Nd:26 | 0 | 65 | 3500 | +40 |
| S36 | 13 | 61 | Nd:26 | 3 | 82 | 3800 | +40 |
| S37 | 13 | 61 | Nd:26 | 20 | 101 | 3000 | −20 |
| S38 | 13 | 61 | Nd:26 | 35 | 95 | 500 | −80 |
| S39 | 13 | 61 | Pr:26 | 10 | 99 | 4000 | −5 |
| S40 | 13 | 61 | Sm:26 | 10 | 97 | 4500 | +5 |
| S41 | 13 | 65 | 22 (Pr/Nd = 0.5/0.5) | 10 | 103 | 4000 | +5 |

Each of the thus-obtained slurries was molded, through a doctor blade coating method, into a sheet having a thickness of 50 μm, and the produced ceramic green sheet was cut into pieces having a size of 30 mm×10 mm. The pieces were laminated and pressed to form a sheet having a thickness of 0.5 mm. Plate-like dielectric ceramics of sample Nos. 68 to 118 were obtained by firing the corresponding pressed sheets in air at not more than 900° C. for one hour.

The dielectric ceramics obtained as described above were subjected to measurement of relative dielectric constant, Q value and temperature coefficient of change in dielectric constant (ppm/° C). The results of measurement are shown in Tables 7 and 8. The amounts of components in Tables 7 and 8 are based on wt. % in the corresponding dielectric ceramic compositions. The relative dielectric constant was measured at a frequency of 1 MHz.

TABLE 7

| Sample No. | Ceramic composition No. | Amount | Glass composition No. | Amount | Additive content (wt %) | CuO Content | Firing temperature (° C.) | Relative dielectric constant ($\epsilon$) | Q | Temperature coefficient of change in capacitance (ppm/° C.) | Remarks |
|---|---|---|---|---|---|---|---|---|---|---|---|
| 68 | S26 | 99.0 | G43 | 0.5 | $TiO_2$:0.1 | 0.4 | 900 | — | — | — | Insufficiently sintered |
| 69 | S26 | 97.5 | G43 | 2.0 | $TiO_2$:0.1 | 0.4 | 900 | 90 | 1500 | +10 | |
| 70 | S26 | 68.5 | G31 | 20 | $TiO_2$:10 | 1.5 | 900 | 58 | 1200 | −10 | |
| 71 | S26 | 58.5 | G31 | 30 | $TiO_2$:10 | 1.5 | 900 | 47 | 500 | +20 | |
| 72 | S26 | 80.0 | G31 | 10 | $TiO_2$:10 | 0 | 900 | 67 | 2000 | −25 | |
| 73 | S26 | 77.0 | G31 | 10 | $TiO_2$:10 | 3.0 | 900 | 85 | 3500 | −50 | |
| 74 | S26 | 75.0 | G31 | 10 | $TiO_2$:10 | 5.0 | 900 | 105 | 2000 | −200 | |
| 75 | S26 | 86.5 | G31 | 10 | $TiO_2$:2 | 1.5 | 900 | 79 | 3700 | −15 | |
| 76 | S26 | 78.5 | G31 | 10 | $TiO_2$:10 | 1.5 | 900 | 81 | 3800 | −45 | |
| 77 | S26 | 58.5 | G31 | 10 | $TiO_2$:30 | 1.5 | 900 | 89 | 2800 | −115 | |
| 78 | S26 | 48.5 | G31 | 10 | $TiO_2$:40 | 1.5 | 900 | — | — | — | Insufficiently sintered |
| 79 | S26 | 86.5 | G31 | 10 | $CaTiO_3$:2 | 1.5 | 900 | 82 | 3300 | −35 | |
| 80 | S26 | 58.5 | G31 | 10 | $CaTiO_3$:30 | 1.5 | 900 | 93 | 2300 | −75 | |
| 81 | 526 | 48.5 | G31 | 10 | $CaTiO_3$:40 | 1.5 | 900 | — | — | — | Insufficiently sintered |
| 82 | S26 | 86.5 | G31 | 10 | $SrTiO_3$:2 | 1.5 | 900 | 82 | 3200 | −45 | |
| 83 | S26 | 58.5 | G31 | 10 | $SrTiO_3$:30 | 1.5 | 900 | 125 | 1800 | −145 | |
| 84 | S26 | 48.5 | G31 | 10 | $SrTiO_3$:40 | 1.5 | 900 | — | — | — | Insufficiently sintered |
| 85 | S26 | 78.5 | G31 | 10 | $TiO_2 + SrTiO_3$:5 + 5 | 1.5 | 900 | 98 | 2500 | −95 | |
| 86 | S26 | 48.5 | G31 | 10 | $TiO_2 + SrTiO_3$:20 + 20 | 1.5 | 900 | — | — | — | Insufficiently sintered |
| 87 | S26 | 83.5 | G31 | 10 | $Nd_2Ti_2O_7$:5 | 1.5 | 900 | 75 | 3200 | | |
| 88 | S26 | 78.5 | G31 | 10 | $Nd_2Ti_2O_7$:10 | 1.5 | 900 | 73 | 2900 | +15 | |
| 89 | S26 | 58.5 | G31 | 10 | $Nd_2Ti_2O_7$:30 | 1.5 | 900 | 63 | 1800 | +40 | |
| 90 | S26 | 48.5 | G31 | 10 | $Nd_2Ti_2O_7$:40 | 1.5 | 900 | — | — | — | Insufficiently sintered |
| 91 | S27 | 78.5 | G31 | 10 | $TiO_2$:10 | 1.5 | 900 | 73 | 1700 | −140 | |
| 92 | S28 | 78.5 | G31 | 10 | $TiO_2$:10 | 1.5 | 900 | 70 | 2000 | −150 | |
| 93 | S29 | 78.5 | G31 | 10 | $TiO_2$:10 | 1.5 | 900 | 51 | 2500 | −130 | |

*: Outside the scope of the invention

TABLE 8

| Sample No. | Ceramic composition No. | Amount | Glass composition No. | Amount | Additive content (wt %) | CuO Content | Firing temperature (° C.) | Relative dielectric constant ($\epsilon$) | Q | Temperature coefficient of change in capacitance (ppm/° C.) | Remarks |
|---|---|---|---|---|---|---|---|---|---|---|---|
| 94 | S30 | 78.5 | G31 | 10 | $TiO_2$:10 | 1.5 | 900 | 45 | 1100 | −40 | |
| 95 | S31 | 78.5 | G31 | 10 | $TiO_2$:10 | 1.5 | 900 | 85 | 2000 | −160 | |
| 96 | S32 | 78.5 | G31 | 10 | $TiO_2$:10 | 1.5 | 900 | 58 | 1800 | −200 | |
| 97 | S33 | 78.5 | G31 | 10 | $TiO_2$:10 | 1.5 | 900 | 39 | 1000 | −50 | |
| 98 | S34 | 78.5 | G31 | 10 | $TiO_2$:10 | 1.5 | 900 | 37 | 1000 | −20 | |
| *99 | S35 | 78.5 | G31 | 10 | $TiO_2$:10 | 1.5 | 900 | 45 | 2500 | −40 | |
| 100 | S36 | 78.5 | G31 | 10 | $TiO_2$:10 | 1.5 | 900 | 60 | 3000 | −40 | |
| 101 | S37 | 78.5 | G31 | 10 | $TiO_2$:10 | 1.5 | 900 | 77 | 2000 | −80 | |
| 102 | S38 | 78.5 | G31 | 10 | $TiO_2$:10 | 1.5 | 900 | 70 | 300 | −160 | |
| 103 | S39 | 86.5 | G31 | 10 | $TiO_2$:10 | 1.5 | 900 | 75 | 2800 | −80 | |
| 104 | S40 | 58.5 | G31 | 10 | $TiO_2$:10 | 1.5 | 900 | 73 | 3000 | −70 | |
| 105 | S41 | 58.5 | G31 | 10 | $TiO_2$:10 | 1.5 | 900 | 80 | 2700 | −70 | |
| *106 | S26 | 78.5 | G32 | 10 | $TiO_2$:10 | 1.5 | 900 | — | — | — | Not sintered |
| 107 | S26 | 78.5 | G33 | 10 | $TiO_2$:10 | 1.5 | 900 | 75 | 3000 | −30 | |
| 108 | S26 | 78.5 | G34 | 10 | $TiO_2$:10 | 1.5 | 900 | 83 | 3600 | −50 | |
| *109 | S26 | 78.5 | G35 | 10 | $TiO_2$:10 | 1.5 | 900 | 84 | 3500 | −55 | Poor moisture resistance |
| *110 | S26 | 78.5 | G36 | 10 | $TiO_2$:10 | 1.5 | 900 | — | — | — | Not sintered |

TABLE 8-continued

| Sample No. | Ceramic composition No. | Amount | Glass composition No. | Amount | Additive content (wt %) | CuO Content | Firing temperature (° C.) | Relative dielectric constant (ε) | Q | Temperature coefficient of change in capacitance (ppm/° C.) | Remarks |
|---|---|---|---|---|---|---|---|---|---|---|---|
| 111 | S26 | 78.5 | G37 | 10 | TiO$_2$:10 | 1.5 | 900 | 82 | 3500 | −45 | |
| *112 | S26 | 78.5 | G38 | 10 | TiO$_2$:10 | 1.5 | 900 | 83 | 3500 | −50 | Poor moisture resistance |
| 113 | S26 | 78.5 | G39 | 10 | TiO$_2$:10 | 1.5 | 900 | 78 | 4000 | −40 | |
| *114 | S26 | 78.5 | G40 | 10 | TiO$_2$:10 | 1.5 | 900 | — | — | — | Not sintered |
| *115 | S26 | 78.5 | G41 | 10 | TiO$_2$:10 | 1.5 | 900 | — | — | — | Not sintered |
| 116 | S26 | 78.5 | G42 | 10 | TiO$_2$:10 | 1.5 | 900 | 76 | 3300 | −40 | |
| 117 | S26 | 78.5 | G43 | 10 | TiO$_2$:10 | 1.5 | 900 | 83 | 3500 | −45 | |
| *118 | S26 | 78.5 | 644 | 10 | TiO$_2$:10 | 1.5 | 900 | 84 | 3000 | −50 | Poor moisture resistance |

*: Outside the scope of the invention

As shown in the sample Nos. 69 through 77, 79, 80, 82, 83, 85, 87 through 89, 91 through 98, 100 through 105, 107, 108, 111, 113, 116, and 117 in Tables 7 and 8, the dielectric ceramic compositions of the present invention have excellent characteristics, i.e., a firing temperature as low as 900° C. or less, a high relative dielectric constant and a high Q value. Control of species and amount of TiO$_2$, CaTiO$_3$, SrTiO$_3$, and Nd$_2$Ti$_2$O$_7$ serving as additives provides desired temperature coefficient of dielectric constant (ppm/° C.).

In contrast, the dielectric ceramic compositions of sample Nos. 106, 109, 110, 112, 114, 115, and 118, are out of the scope of the present invention due to the reasons cited in the remarks indicated in Tables 7 and 8.

CuO incorporated as an auxiliary component may be added by preparing glass compositions containing CuO so as to have compositional proportions shown in Tables 7 and 8 and adding the thus-prepared compositions to high-frequency ceramic compositions as well as adding CuO, as described in the example, to mixtures of the ceramic compositions and the glass compositions, to exhibit equivalent effects.

The dielectric ceramic composition according to the present invention can be sintered at temperature lower than the melting point of an electric conductor containing, as a primary component, a low-specific-resistance metal selected from silver, gold and copper. Moreover, there can be obtained a dielectric ceramic composition having a high relative dielectric constant (ε) within a high-frequency region, particularly within the microwave region and the millimeter wave region, and excellent temperature stability with respect to dielectric constant and capacitance.

Addition of CuO, as an auxiliary component, to the mixture comprising a ceramic composition and a glass composition further lowers sintering temperature of the resultant mixture and increases the Q value and the dielectric constant thereof.

Moreover, addition of appropriate amounts of TiO$_2$, CaTiO$_3$ and SrTiO$_3$ having a negative temperature-dependent characteristic of dielectric constant and Nd$_2$Ti$_2$O$_7$ having a positive temperature-dependent characteristic of dielectric constant enables control of the temperature coefficient of dielectric constant of the produced dielectric ceramic compositions to a desired value.

Therefore, such a dielectric ceramic composition can be fired simultaneously with a low-specific-resistance internal electrode made of gold, silver, copper, etc., to thereby yield dielectrics or multilayer circuit boards containing such an internal electrode and having excellent high-frequency characteristics and a desirable temperature coefficient of dielectric constant. Electronic apparatus such as an LC resonator, an LC filter or a laminated capacitor having a high Q value can be further miniaturized by use of the lamination method and the dielectric ceramic composition.

What is claimed is:

1. A dielectric ceramic composition which comprises a mixture of a BaO—TiO$_2$—REO$_{3/2}$—Bi$_2$O$_3$-based ceramic composition, wherein RE represents a rare earth element and a glass composition containing about 13–50 wt. % SiO$_2$, about 3–30 wt. % B$_2$O$_3$, about 40–80 wt. % alkaline earth metal oxide and about 0.1–10 wt. % Li$_2$O.

2. The dielectric ceramic composition according to claim 1, which contains CuO.

3. The dielectric ceramic composition according to claim 2, wherein the BaO—TiO$_2$—REO$_{3/2}$—Bi$_2$O$_3$-based ceramic composition comprises xBaO—yTiO$_2$—zREO$_{3/2}$ in which x, y, and z are mole % and x+y+z=100 and 5≦x≦15, 52.5≦y≦70, 15≦z≦42.5, as a primary component, and Bi$_2$O$_3$ in an amount of about 3–30 wt. % with respect to 100 parts by weight of the primary component.

4. The dielectric ceramic composition according to claim 3, wherein the alkaline earth metal oxide contained in the glass composition comprises BaO and at least one member selected from the group consisting of SrO, CaO and MgO, and the compositional proportions thereof fall within the following ranges: about 35 wt. % or less SrO, about 35 wt. % or less CaO, about 20 wt. % or less MgO, and about 40–95 wt. % BaO.

5. The dielectric ceramic composition according to claim 4, wherein the BaO—TiO$_2$—REO$_{3/2}$—Bi$_2$O$_3$-based ceramic composition is about 75–95 wt. %, the glass composition is about 2–20 wt. % and CuO is about 5 wt. % or less.

6. The dielectric ceramic composition according to claim 5, wherein the glass composition contains 0.5–10 wt. % Li$_2$O and at least one additive selected from the group consisting of TiO$_2$, CaTiO$_3$, SrTiO$_3$ and Nd$_2$Ti$_2$O$_7$.

7. The dielectric ceramic composition according to claim 6, wherein the BaO—TiO$_2$—REO$_{3/2}$—Bi$_2$O$_3$-based ceramic composition is about 50–98 wt. %, the glass composition is about 2–20 wt. %, the additive is about 30 wt. % or less, and the CuO is about 3 wt. % or less.

8. The dielectric ceramic composition according to claim 1, wherein the glass composition contains 0.5–10 wt. %

$Li_2O$ and at least one additive selected from the group consisting of $TiO_2$, $CaTiO_3$, $SrTiO_3$ and $Nd_2Ti_2O_7$.

9. The dielectric ceramic composition according to claim 2, wherein the $BaO$—$TiO_2$—$REO_{3/2}$—$Bi_2O_3$-based ceramic composition is about 75–95 wt. %, the glass composition is about 2–20 wt. % and CuO is about 5 wt. % or less.

10. The dielectric ceramic composition according to claim 1, wherein the alkaline earth metal oxide contained in the glass composition comprises BaO and at least one member selected from the group consisting of SrO, CaO and MgO, and the compositional proportions thereof fall within the following ranges: about 35 wt. % or less SrO, about 35 wt. % or less CaO, about 20 wt. % or less MgO, and about 40–95 wt. % BaO.

11. The dielectric ceramic composition according to claim 1, wherein the $BaO$—$TiO_2$—$REO_{3/2}$—$Bi_2O_3$-based ceramic composition comprises $xBaO$—$yTiO_2$—$zREO_{3/2}$ in which x, y, and z are mole % and x+y+z=100 and $5 \leq x \leq 15$, $52.5 \leq y \leq 70$, $15 \leq z \leq 42.5$, as a primary component, and $Bi_2O_3$ in an amount of about 3–30 wt. % with respect to 100 parts by weight of the primary component.

12. A ceramic electronic element comprising an electronic component and the dielectric ceramic composition of claim 1.

13. A ceramic electronic element comprising an electronic component and the dielectric ceramic composition of claim 2.

14. A ceramic electronic element comprising an electronic component and the dielectric ceramic composition of claim 3.

15. A ceramic electronic element comprising an electronic component and the dielectric ceramic composition of claim 7.

16. The ceramic electronic element of claim 15 in the form of an LC composite element.

17. The ceramic electronic element of claim 14 in the form of an LC composite element.

18. The ceramic electronic element of claim 13 in the form of an LC composite element.

19. The ceramic electronic element of claim 12 in the form of an LC composite element.

* * * * *